(12) United States Patent
Gardner et al.

(10) Patent No.: US 6,405,462 B1
(45) Date of Patent: Jun. 18, 2002

(54) ANIMAL EAR TAG

(76) Inventors: Michael Stuart Gardner, 108 Waiatarua Road, Remuera, Auckland; Roy Victor Bladen, 292 Glenmore Road, Albany, Auckland, both of (NZ)

( * ) Notice: Subject to any disclaimer, the term of this patent is extended or adjusted under 35 U.S.C. 154(b) by 0 days.

(21) Appl. No.: 09/076,166

(22) Filed: May 5, 1998

Related U.S. Application Data

(63) Continuation of application No. PCT/NZ96/00074, filed on Jul. 12, 1996.

(30) Foreign Application Priority Data

Jul. 12, 1995 (NZ) .............................. 272550

(51) Int. Cl.[7] .............................................. A01K 11/00
(52) U.S. Cl. ............................................. 40/301; 40/302
(58) Field of Search ..................... 40/301, 302; 24/3.4, 24/324

(56) References Cited

U.S. PATENT DOCUMENTS

| | | | |
|---|---|---|---|
| 4,102,073 A | * | 7/1978 | Hayes .......................... 40/301 |
| 4,597,208 A | * | 7/1986 | Chevillot ..................... 40/301 |
| 5,279,420 A | * | 1/1994 | Rodgers ....................... 40/688 |

FOREIGN PATENT DOCUMENTS

| | | | |
|---|---|---|---|
| AT | 11957 | * 3/1903 | .................. 40/301 |
| EP | 0056533 | 7/1982 | |
| EP | 0502584 | 9/1992 | |
| NZ | 155099 | 1/1969 | |
| NZ | 187772 | 12/1980 | |
| NZ | 210322 | 12/1985 | |
| NZ | 219430 | 2/1987 | |
| NZ | 231510 | 11/1989 | |
| NZ | 228664 | 2/1991 | |
| NZ | 236752 | 5/1993 | |
| WO | WO91/10982 | 7/1991 | |
| WO | WO95/25426 | 9/1995 | |

* cited by examiner

*Primary Examiner*—Cassandra H. Davis
(74) *Attorney, Agent, or Firm*—Jacobson Holman PLLC

(57) ABSTRACT

An animal ear tag having a male component including a main body portion, a neck portion extending from the main body portion and a tip portion for engagement with a female component. The distal end of the neck portion from the body portion provides a base for the tip portion. The tip portion is of pyramidal shape with at least three upper edges converging at the apex. The tip portion includes hollow areas between an internal core and two opposite pyramidal faces into which corresponding protrusions of the base of the neck portion interlock.

4 Claims, 4 Drawing Sheets

ANIMAL EAR TAG

This application is a continuation of PCT/NE96/00074 filed Jul. 12, 1996.

BACKGROUND OF THE INVENTION

This invention relates to animal ear tags, in particular to tags comprising two pieces, namely a piercing male component and an engaging female component, adapted to cooperate on opposite sides of an animals ear.

Two piece ear tags generally comprise a male component having a body portion, neck portion and head portion, and a female component having a body portion and engaging portion to receive the head portion of the male component. The structure of the head portion and its engagement with the engaging portion are a key feature to such two piece tags. It is necessary that the head portion be retained securely in the engaging portion once engaged.

Two piece ear tags require that the head portion is capable of piercing. To achieve this the head portion may include a hard plastic tip or a metal piercing tip. Since it is necessary that the neck portion be flexible this requires some form of interconnection between the hard plastic material of the tip and the flexible material of the neck. This can result in a weak point in the design.

Prior two piece ear tags have had portions which are poorly or inadequately secured in the engaging portion, which fail to consider the issue of tamper-proofing and/or which fail to provide an adequate cutting component on the head portion.

OBJECT OF THE INVENTION

Thus, it is an object of the present invention to provide an ear tag for animals with at least one of the following features: improved interlocking of the head portion with the engaging portion; tamper-proofing characteristics such that when the two piece tag is pulled apart, the male and female parts are destroyed and they cannot be reused; an improved cutting edge of the head portion; and improved interconnection between the cutting tip and the remainder of the head portion. Alternatively it is an object of the present invention to at least provide the public with a useful alternative form of animal ear tags.

Further objects of the present invention will become apparent from the following description which is given by way of example only.

SUMMARY OF THE INVENTION

According to one aspect of the present invention there is provide an animal ear tag comprising:
 a main body portion;
 a neck portion extending from the main body portion;
 a distil end of the neck portion from the body portion forming a base for a tip portion; and
 a tip portion connected to the base.

According to a further aspect, the invention comprises a method of manufacturing an animal ear tag comprising the steps of:
 providing a main body portion;
 providing a neck portion extending from said main body portion;
 forming a base for a tip portion from a distal end of said neck portion; and
 connecting a tip portion to the base.

Further aspects of the present invention will become apparent from the following description.

BRIEF DESCRIPTION OF THE DRAWINGS

Preferred embodiments will now be described and be given by way of example and with reference to the accompanying drawings in which.

DETAILED DESCRIPTION OF PREFERRED EMBODIMENT

The ear tag of the present invention may be employed as a two-piece tag.

Figure 1:
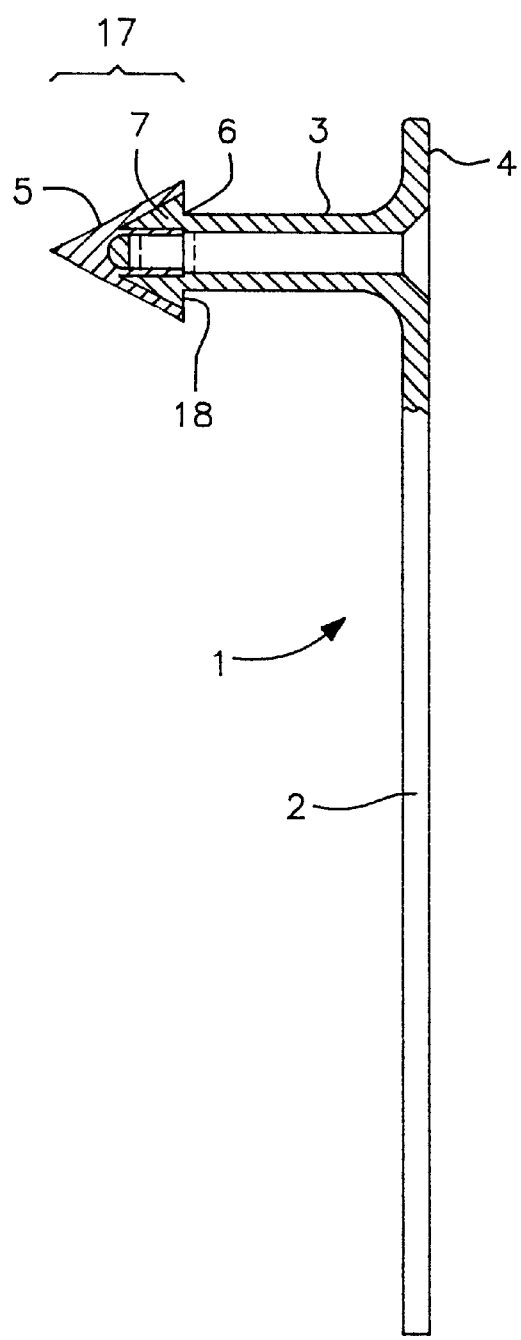
FIG. 1 shows a longitudinal section through a first component of the ear tag of the present invention.
Figure 2:
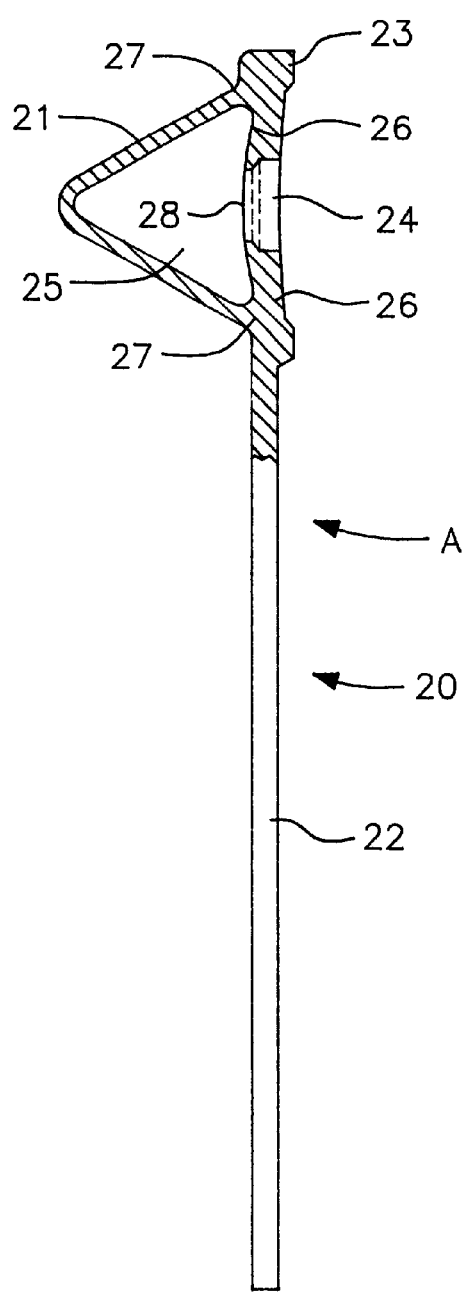
FIG. 2 shows a cross section through a second component of an ear tag of the present invention.

When employed as a two-piece tag it comprises a male component 1 (see FIG. 1) and a female component (see FIG. 2).

In the preferred embodiment shown in the figures, the male component 1 comprises a body 2, a neck 3 extending substantially perpendicular to the body and adjacent one end 4 thereof, and a tip 5.

The upper end 6 of the neck 3 forms a base 7 for the tip 5.

The body 2 and neck 3, including the base 7, are made from a pliable plastics material. The tip 5 is made from a hard plastic material.

Figure 4:
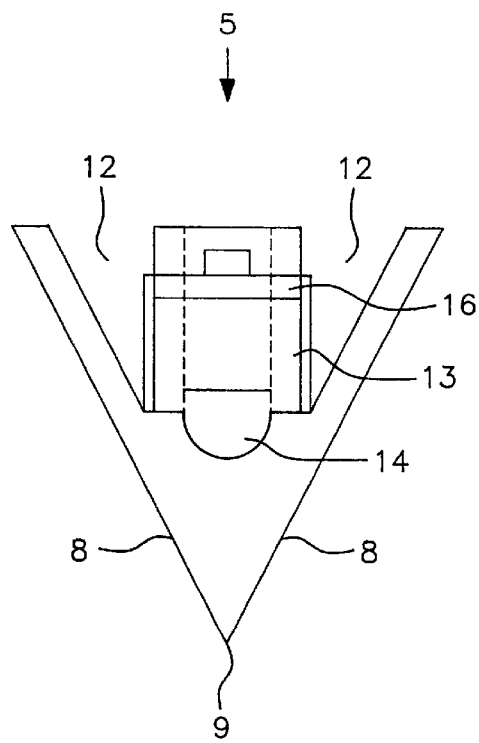
FIG. 4 shows a cross section through a tip portion of an ear tag of the present invention.
Figure 5:
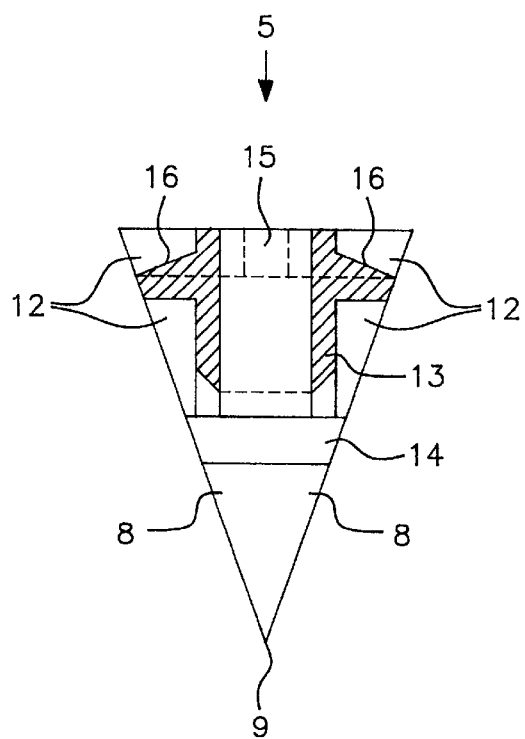
FIG. 5 shows a plan view on the tip portion, at 90° to the cross section of FIG. 4.
Figure 6:
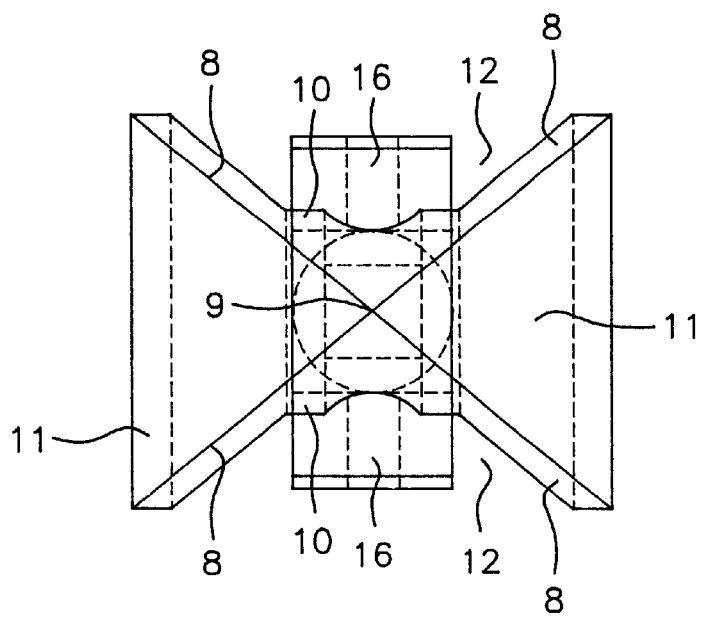
FIG. 6 shows a view from below the base of a tip portion of the ear tag of the present invention.
Figure 7:
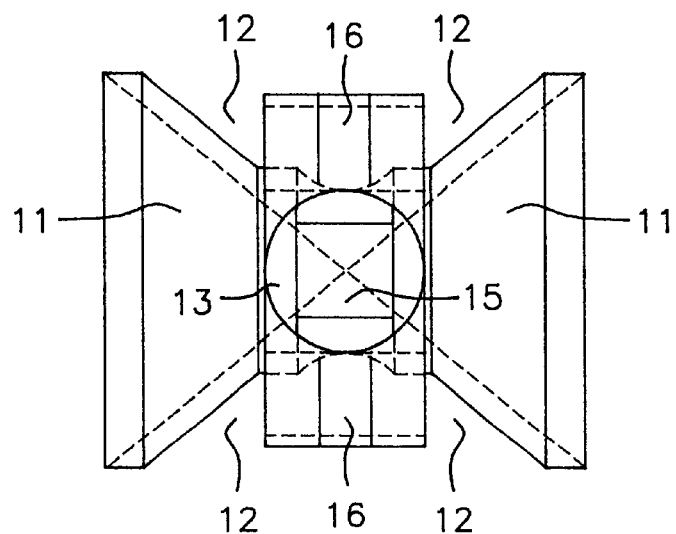
FIG. 7 shows a view from above the apex of the tip portion of the ear tag of the present invention.

FIGS. 4 to 7 show details of the tip 5 of the male component 1. Referring to FIGS. 6 and 7, the tip 5 has a pyramidal shape, having four cutting edges 8 meeting at apex 9. Two opposing sides 10 are shorter than the other sides 11, so that hollow portions 12 are formed.

All the cutting edges 8 extend the full length of the tip 5.

Referring to FIGS. 4 and 5, the tip 5 has an internal core 13 and a hole 14 positioned between the apex 9 and internal core 13, and interconnecting the hollow portions 12 on opposite sides 11 of the tip 5.

The internal core 13 is substantially square in shape, and has a hollow centre 15 extending through the core 13 to the hole 14. Lateral extensions 16 are positioned on opposite sides of the core 13, extending into spaces 12.

The base 7 of the neck portion 3 forms a configuration complementary to the hollow and solid parts of the tip 5, i.e. filling the hole 14, and side spaces 12. It does not fill the hollow centre 15 which is required to allow an applicator pin to locate onto the tip.

Thus, a head 17 of the male component 1 is essentially formed from two materials, the harder material of the tip 5 and the softer material of the base 7 of the neck 3.

Figure 3:
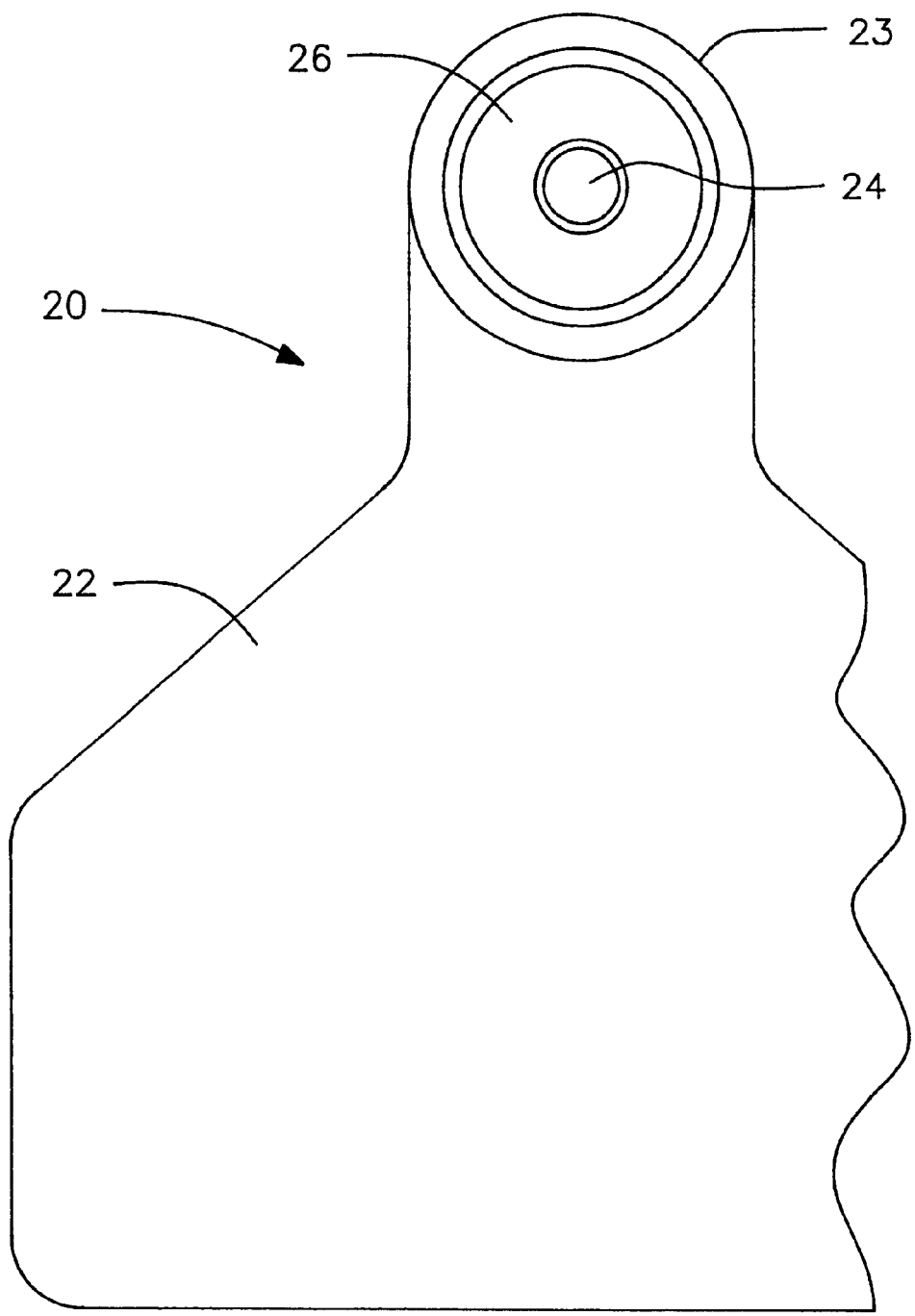
FIG. 3 shows a plan view of a body part of the component of FIG. 2 from A.

Referring to FIGS. 2 and 3, the female component 20 comprises a further body 22 and an engaging portion 21 positioned adjacent one end 23 of the body 22. The engaging portion 21 comprises a pocket 25, adapted to accommodate the head 17 of the male component 1, and an orifice 24 of diameter similar to that of the neck 3 of the male component 1 but smaller than that of the widest part of the head 17. Inner surfaces 26 of the pocket 25 adjacent the orifice 24 slope away from the orifice 24 so that outer corners 27 of the pocket 25 are below the level of the inner surface 28 of the orifice 24.

With this configuration, pressure applied to the underside 18 of the base 7 will cause the extended sides 11 of the tip 5 to move outwardly or spread. When the head 17 is engaged in an engaging portion 21 of the female component 20, such pressure will therefore increase the grip of the tip 5 within the engaging portion 21.

It will be appreciated that when excessive pressure is applied to try to remove the head 17 from the engaging portion 21, the neck 3 will break free of the tip 5 leaving the tip 5 still enclosed in the engaging portion 21. The body 2 and remaining neck 3 of the male component 1 are not then reusable, and the female component 20 is also not reusable in which case any tampering will be obvious.

However, during fitting, the extended sides 11 may compress to allow fitment through the orifice 24.

It will be appreciated that the male component of the present invention may be manufactured by moulding the end of the neck into the tip, or alternatively by forming the shape of the base of the neck independently of the tip and then interlocking the two portions.

What is claimed is:

1. An animal ear tag comprising in combination a male tag component and a female tag component, said male tag component having a main body portion; a neck portion extending from the main body portion; a distal end of the neck portion from the body portion forming a base; a head portion connected to the base, the head portion including a tip portion formed of a harder material than a softer material forming the base, the tip portion including a plurality of cutting edges extending from the base and converging to an apex distal from said base, the tip portion including hollow areas into which corresponding protrusions of the base of the neck portion interlock, the hollow areas including an internal part, and lower parts of two first opposing faces, of the tip portion, such that the majority of two other opposing faces and four of said cutting edges form the tip portion and are of said harder material whilst at least lower parts of said two first opposing faces comprise part of the base of the neck portion and are of said softer material, and wherein the softer material of the base permits compression of the tip portion; the female tag component having an engaging portion adapted to engage and interlock with the head portion, the compression of the tip portion due to its entry into the engaging portion enabling the entry of the head portion including the tip portion into the engaging portion but subsequent expansion of the tip portion preventing the removal of the head portion from the engaging portion, the head portion being adapted to break away from the neck portion when excessive force is applied.

2. An animal ear tag as claimed in claim 1, wherein said tip portion is of a pyramidal shape with at least three of said cutting edges converging at the apex.

3. An animal ear tag as claimed in claim 1, wherein said cutting edges run substantially the full length of the tip portion.

4. An animal ear tag as claimed in claim 1, wherein the tip portion is a four-sided pyramidal shape.

* * * * *